US009307225B2

(12) United States Patent
Suresh (10) Patent No.: US 9,307,225 B2
(45) Date of Patent: Apr. 5, 2016

(54) ADAPTIVE STEREOSCOPIC 3D STREAMING

(71) Applicant: Citrix Systems, Inc., Fort Lauderdale, FL (US)

(72) Inventor: Ashwin Mysore Suresh, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 584 days.

(21) Appl. No.: 13/660,442

(22) Filed: Oct. 25, 2012

(65) Prior Publication Data

US 2014/0118489 A1   May 1, 2014

(51) Int. Cl.
| | |
|---|---|
| H04N 15/00 | (2006.01) |
| H04N 13/00 | (2006.01) |
| H04N 21/2343 | (2011.01) |
| H04N 21/24 | (2011.01) |
| H04N 21/81 | (2011.01) |
| H04N 19/597 | (2014.01) |
| H04N 19/169 | (2014.01) |
| H04N 19/132 | (2014.01) |
| H04N 19/136 | (2014.01) |
| H04N 19/146 | (2014.01) |
| H04N 19/164 | (2014.01) |
| H04N 19/587 | (2014.01) |
| H04N 19/59 | (2014.01) |

(52) U.S. Cl.
CPC ......... *H04N 13/0048* (2013.01); *H04N 19/132* (2014.11); *H04N 19/136* (2014.11); *H04N 19/146* (2014.11); *H04N 19/164* (2014.11); *H04N 19/169* (2014.11); *H04N 19/587* (2014.11); *H04N 19/59* (2014.11); *H04N 19/597* (2014.11); *H04N 21/234363* (2013.01); *H04N 21/234381* (2013.01); *H04N 21/2402* (2013.01); *H04N 21/816* (2013.01); *H04N 13/0029* (2013.01)

(58) Field of Classification Search
CPC .......... H04N 13/0003; H04N 13/0048; H04N 13/0059; H04N 19/184
See application file for complete search history.

(56) References Cited

U.S. PATENT DOCUMENTS

2003/0103563 A1* 6/2003 Amini et al. ............. 375/240.03
2008/0137133 A1* 6/2008 Trappe ......................... 358/1.15

(Continued)

OTHER PUBLICATIONS

Anil Aksay et al., End-to-end stereoscopic video streaming with content-adaptive rate and format control, Signal Processing: Image Communication, vol. 22, Issue 2, Feb. 2007, pp. 157-168.*

(Continued)

*Primary Examiner* — Sath V Perungavoor
*Assistant Examiner* — Xiaolan Xu
(74) *Attorney, Agent, or Firm* — Banner & Witcoff, Ltd.

(57) ABSTRACT

Aspects herein describe at least a new method, system, and computer readable storage media for processing two-dimensional (2D) video into three-dimensional (3D) video and transmitting the 3D video from a host computing device to a client computing device. In one embodiment, the method comprises spatially scaling a segment of video when a structural similarity index is greater than a first threshold value and temporally scaling the segment of video when a rate of change of successive frames of the segment falls below a second threshold value. The method generates one of the segment, a spatially scaled segment, a temporally scaled segment, and a temporally and spatially scaled segment. The method further comprises multiplexing one of the segment, the spatially scaled segment, a temporally scaled segment, and a temporally/spatially scaled segment of the video in a second channel with the segment of the video in a first channel.

20 Claims, 4 Drawing Sheets

(56) References Cited

U.S. PATENT DOCUMENTS

2009/0099919 A1* 4/2009 Schultheiss et al. ............ 705/14
2010/0259596 A1 10/2010 Park et al.

OTHER PUBLICATIONS

International Search Report and Written Opinion issued in PCT/US203/063776, Jan. 2, 2014.

Bovik et al., "Image Quality Assessment—From Error Visibility to Structural Similarity," IEEE Transactions on Image Processing IEEE Service Center, Apr. 1, 2004, pp. 600-612, vol. 13, No. 4, Piscataway, NJ.

Askay et al., "End-to-End Stereoscopic Video Streaming with Content-Adaptive Rate and Format Control," Signal Processing, Image Communication, Elsevier Science Publishers, Mar. 16, 2007, vol. 22, No. 2, Amsterdam, NL.

* cited by examiner

ADAPTIVE STEREOSCOPIC 3D STREAMING

FIELD

Generally, aspects described herein relate to computers, software, and networking. More specifically, aspects described herein relate to the implementation of adaptive compression in the transmission of stereoscopic 3D (three-dimensional) video.

BACKGROUND

The use of stereoscopic displays as a preferred display option is prevalent in many different industries. With the advent of 3D (three-dimensional) displays, smart phones, and tablets, the demand for 3D streaming has dramatically increased.

Compared to 2D (two-dimensional) video, the bandwidth requirements for 3D video are usually doubled since video is typically transmitted for two channels (a channel for the left eye and a channel for the right eye), as opposed to just a single channel. When 3D video is streamed, the use of both a stream for the left eye and a stream for the right eye allows for the viewing of stereoscopic video. Thus, the transmission of 3D video results in an increased bandwidth requirement compared to that of 2D video.

However, when the video data rate of the stereoscopic 3D video exceeds the available transmission bandwidth, the resulting signal quality is affected. Thus, there is a need to overcome these deficiencies.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In order to address the above shortcomings and additional benefits that will be realized upon reading the disclosure, aspects herein describe new methods and systems for appropriately applying adaptive compression to a video channel in the transmission of stereoscopic 3D (three-dimensional) video.

According to some aspects of the disclosure, an apparatus, such as computing device, provides a method to first identify a first frame of a segment of video in a first channel at a first time and to second identify a second frame of the segment of the video in the first channel at a second time. The first time may occur one frame period before said second time. The computing device may spatially scale the segment when a structural similarity (SSIM) index is greater than a first threshold value. The use of spatial scaling reduces the spatial resolution of the segment to generate a spatially scaled segment. The structural similarity (SSIM) index provides a value that indicates a spatial similarity between the first frame and the second frame. The computing device may temporally scale one of: a) the segment and b) the spatially scaled segment, when a rate of change between the first frame and the second frame of the segment falls below a second threshold value. The use of temporal scaling generates one of: a) a temporally scaled segment and b) a temporally and spatially scaled segment. The computing device may multiplex one of: a) the segment, b) the spatially scaled segment, c) the temporally scaled segment, and d) the temporally and spatially scaled segment in a second channel with the segment of the video in the first channel, wherein the first channel and the second channel are used for providing streaming stereoscopic three-dimensional video.

The various aspects of the illustrative embodiments are substantially shown in and/or described in connection with at least one of the following figures, as set forth more completely in the claims.

These and other advantages, aspects, and novel features of the present disclosure, as well as details of illustrated embodiments, thereof, will be more fully understood from the following description and drawings.

BRIEF DESCRIPTION OF THE DRAWINGS

Having thus described aspects of the disclosure in general terms, reference will now be made to the accompanying drawings, which are not necessarily drawn to scale, and wherein:

DETAILED DESCRIPTION

Various aspects of the disclosure relate to the implementation of adaptive compression in the transmission of stereoscopic 3D (three-dimensional) video. The type of compression applied is based on the type of video to be transmitted and bandwidth constraints of the transmission line.

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

Various aspects described herein may be embodied as a method, a data processing system or apparatus, or a computer program product. Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including magnetic hard disk drives, optical discs such as CDs and DVDs, and/or other optical media or optical drives, NAS (network attached storage) devices, and/or any combination thereof. In addition, various signals, such as one or more digital signals, may comprise data (uncoded, coded, or encrypted) that may be transmitted between computing devices. The computing devices may comprise one or more computers (e.g., PC, desktop computer, laptop computer), one or more portable wireless computing devices (e.g., a wireless phone, PDA, laptop computer, notepad), or any kind of computing device comprising a processor and memory which is capable of executing firmware and/or software.

Figure 1:
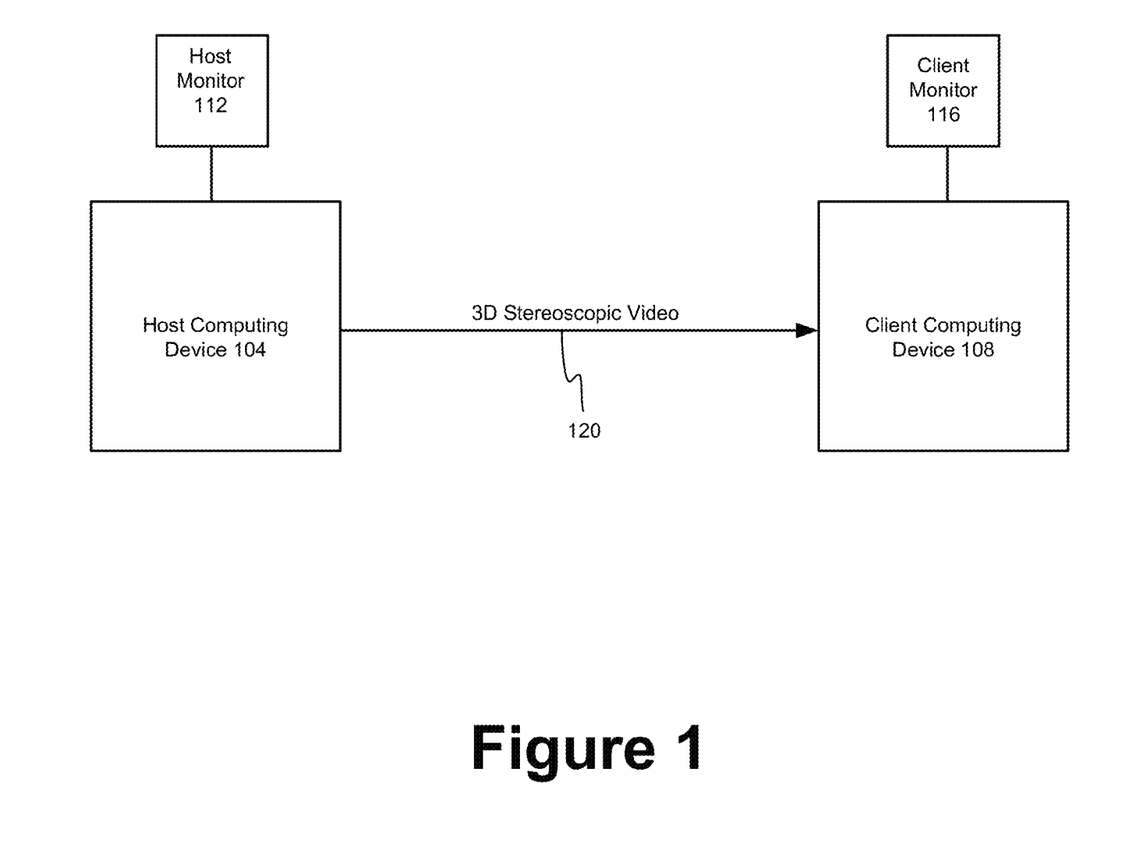
FIG. 1 illustrates an operating environment in which various aspects of the disclosure may be implemented.

FIG. 1 illustrates an operating environment in which various aspects of the disclosure may be implemented. The operating environment includes a host computing device 104 and a client computing device 108. The host computing device 104 is communicatively coupled to a host monitor 112. The client computing device 108 is communicatively coupled to a client monitor 116. The transmission link 120 may comprise a wired or wireless transmission link 120. For example, the transmission link 120 may comprise a packet switched data link and/or mobile communications wireless link or a combination thereof. The Internet, for example, may also be used to implement the transmission link 120. The host computing device 104 may display one or more segments on the screen of the host monitor 112. The client computing device 108 may display the one or more video segments on the screen of the client monitor 116. Each of the one or more segments may have its own frame rate. The one or more video segments may comprise a movie, an application, a slide show, a picture, or other media. Each of the one or more segments may occupy a portion of the screen of the host monitor 112. The one or more segments displayed on the screen of the client monitor 116 may comprise a 3D version of what is displayed on the host monitor 112. The host computing device 104 may process the one or more segments to generate the stereoscopic 3D video for transmission to the client computing device 108. The 3D video comprises left and right video channels. The host computing device 104 may comprise a server that executes a thin-client application using a thin-client protocol to transmit 3D video from the host computing device 104 to the client computing device 108. The stereoscopic 3D video may be generated using monoscopic 2D video. In a representative embodiment, the stereoscopic 3D video may be transmitted from the host computing device 104 to the client computing device 108 using a presentation layer protocol, such as an ICA (independent computing architecture) protocol. The client computing device 108 displays the received stereoscopic 3D video. Prior to being transmitted, the one or more video segments of a channel of the stereoscopic 3D video may be adaptively compressed by the host computing device 108 based on the type of segment being transmitted. The type of compression performed may comprise spatial and/or temporal filtering or scaling. The compression may occur based on an assessment of the transmission quality and/or network conditions associated with the transmission link 120.

While FIG. 1 illustrates a single client computing device 108, in other embodiments, the client computing device 108 may comprise one or more client computing devices 108 in communication with the host computing device 104. Therefore, in some embodiments, the host computing device 104 may transmit the stereoscopic 3D video to multiple client computing devices (not shown). In such embodiments, each of one or more transmission links may be monitored and used to adaptively perform video compression.

Figure 2:
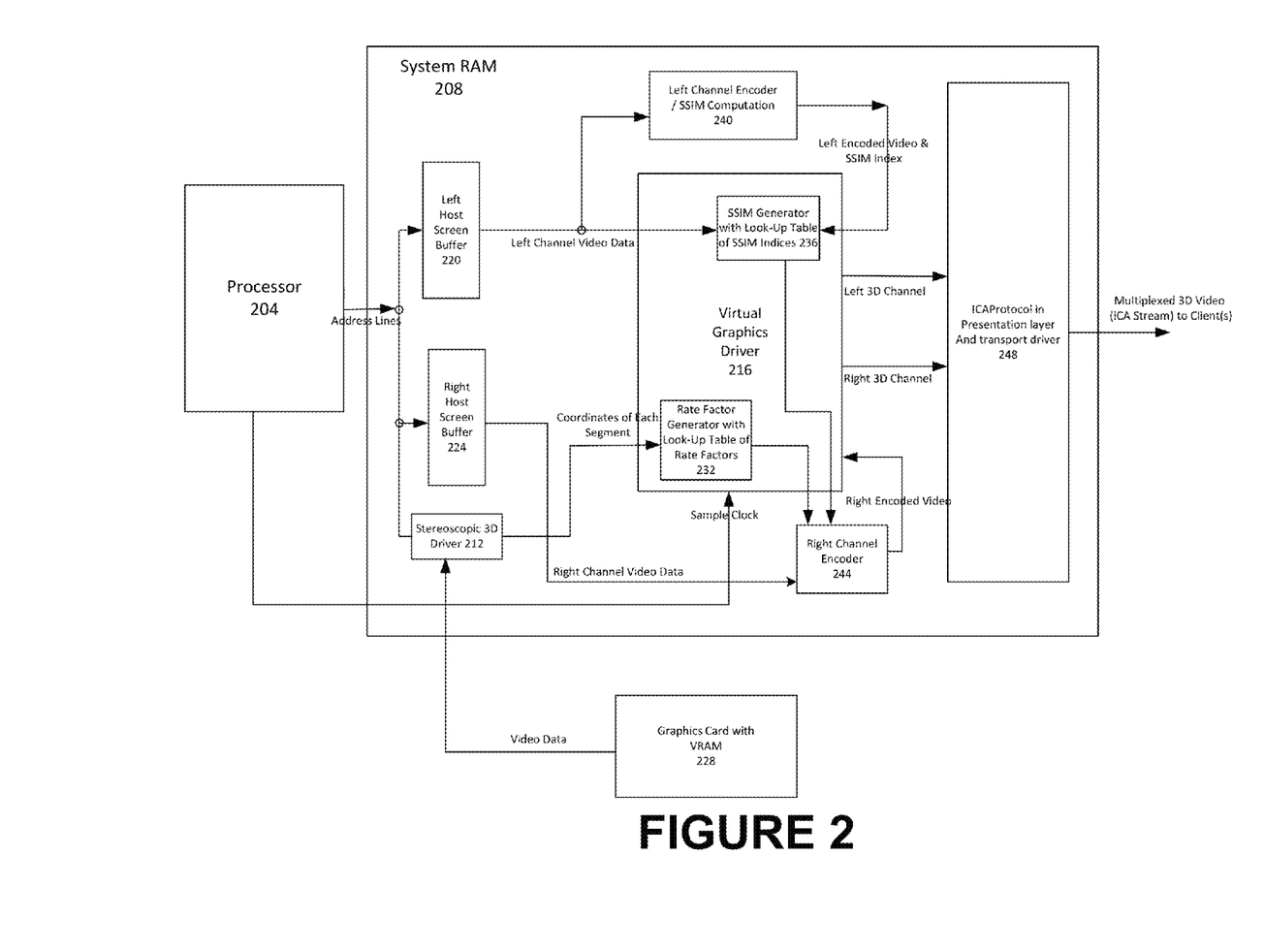
FIG. 2 is a system block diagram in which various aspects of the disclosure may be implemented.

FIG. 2 is a system block diagram in which various aspects of the disclosure may be implemented. The system outputs stereoscopic 3D video stream from the host to one or more clients. The system comprises a processor 204 and memory. The memory may comprise system RAM (random access memory) 208 resident in the host computing device previously described in connection with FIG. 1. The system RAM 208 may store software for implementing a stereoscopic 3D driver 212 and a virtual graphics driver 216 when executed by the processor 204. The processor 204 addresses the system RAM using address lines as shown. The processor 204 may write video data into the system RAM 208 and may read video data from the system RAM 208.

As shown, the video data may be stored in the system RAM 208 at addressable memory locations which define a left host screen buffer 220 and a right host screen buffer 224. The left host screen buffer 220 may output video data corresponding to one or more segments of the screen of the host monitor. The host monitor may display the video data as monoscopic 2D data. Similarly, the right host screen buffer 224 may output video data corresponding to one or more segments of the screen of the host monitor. The system outputs a stereoscopic 3D stream formed by multiplexing a left eye video stream and a right eye video stream. The left host screen buffer 220 may be used to generate the left eye video stream while the right host screen buffer 224 may be used to generate the right eye video stream. A graphics card with video RAM (VRAM) 228 transmits video data to the system RAM 208 by way of a computer bus. The video RAM may be used to store the video data before it is displayed on the host monitor.

The stereoscopic 3D driver 212 facilitates the transmission of the video data from the graphics card 228 to the system RAM 208. The stereoscopic 3D driver 212 is a software driver that is resident in system RAM 208 and is executed by the processor 204. As illustrated, the stereoscopic 3D driver 212 facilitates the transmission of video data into the left host screen buffer 220 and the right host screen buffer 224. Alternatively, the virtual graphics driver 216 may facilitate the transmission of the video data into the left host screen buffer 220 and the right host screen buffer 224. Yet in another embodiment, the virtual graphics driver 216 may work cooperatively with the stereoscopic 3D driver 212 to facilitate the transmission of the video data from the graphics card 228 to the left host screen buffer 220 and the right host screen buffer 224.

The stereoscopic 3D driver 212 may provide an indication when a segment is updated. The indication may be transmitted to the virtual graphics driver 216. When the segment is updated with a new frame, the stereoscopic 3D driver 212 may provide the spatial coordinates of the updated segment displayed on the screen of the host computer device. The rate in which new frames for each segment of one or more segments are displayed on the screen of the host computing device may be computed. The rates for the one or more segments may be stored into a look-up table. The look-up table may be stored in the system RAM 208. As indicated in FIG. 2, spatial coordinates are provided as inputs to the virtual graphics driver 216 for each segment that is updated or refreshed. As shown in FIG. 2, the spatial coordinates may be provided as an input to the virtual graphics driver 216.

The virtual graphics driver 216 utilizes these spatial coordinates as inputs for a rate factor generator 232. The rate factor generator 232 may be a component of the virtual graphics driver 216. The rate factor generator 232 may be invoked as a routine when the virtual graphics driver 216 is executed. The rate factor generator 232 may compile a look-up table of rate factors based on the rate in which frame updates occur for each segment presented on the screen of the host computing device. When the images for a segment are updated or refreshed more frequently, the rate factor obtained from the look-up table increases proportionately. A rate factor comprises a value that provides the rate in which frames of a segment are updated. The look-up table may provide a rate factor for each of one or more segments presented on the screen of the host computing device. Each of the one or more rate factors may be revised when an update is received from the stereoscopic 3D driver. In some aspects, the rate factor provides a direct indication of the temporal activity of a particular segment. A higher rate factor indicates higher temporal activity. As illustrated, a sample clock signal may be generated by the processor 204 for use by the virtual graphics driver 216. The sample clock may be used to measure the rate in which frames of a segment are displayed. The update may occur periodically or non-periodically depending on content of the video. The sample clock may be generated at a particular fixed frequency based on the temporal resolution desired. The one or more rate factors for the one or more segments may be computed and stored in the system RAM 208.

The virtual graphics driver 216 comprises a structural similarity (SSIM) generator 236. The structural similarity (SSIM) generator 236 may be a component of the virtual graphics driver 216. The structural similarity (SSIM) generator 236 may be invoked as a routine when the virtual graphics driver 216 is executed by the processor 204. The structural similarity (SSIM) generator 236 may compile a look-up table of SSIM indices. Each index of the SSIM indices provides a measure of the similarity between the current image and a previous image taken one frame period earlier. The last two frames of a segment may be compared with respect to their structural similarity. If successive images of a segment differ more than they differed previously, the SSIM index of the segment decreases proportionately. For each segment, the chroma or luma for one or more pixels of the screen may be compared between two successive images. When the difference between corresponding pixels is large, the structural similarity is low and the spatial activity is high. Therefore, the SSIM index is inversely correlated to spatial activity. The look-up table associated with the SSIM generator 236 may provide SSIM indices for each of one or more segments presented on the screen of the host computing device. For each segment, the SSIM generator 236 generates an SSIM index that is output to a right channel encoder 244. The SSIM index is inversely correlated to spatial activity of a particular segment. Therefore, the SSIM index provides an indication of the spatial inactivity of a particular segment. A higher SSIM index indicates lower spatial activity. As illustrated, a sample clock signal may be generated by the processor 204 for use by the virtual graphics driver 216. The sample clock may be used in the computation of the SSIM. The left channel encoder 240 receives left channel video data from the left host screen buffer 220. The left channel encoder 240 encodes and/or compresses the left channel video data based on the SSIM indices provided by the SSIM generator 236. The left channel encoder 240 computes an SSIM index for each segment of the one or more segments displayed on the host computing device. The SSIM index and left encoded video is transmitted to the SSIM generator 236 where the SSIM index is saved in system RAM 208 into a look-up table of SSIM indices. The sample clock may be generated at a periodic frequency and may be used to clock the left channel video data into the left channel encoder 240. The left channel encoder 240 and the right channel encoder 244 may be implemented using a codec. While FIG. 2 illustrates separate left and right encoders, the right and left encoders may be implemented as a single encoder within a codec. The codec may be implemented using hardware or software.

As illustrated in FIG. 2, the SSIM generator 236 and the rate factor generator 232 transmits outputs to the right channel encoder 244. The SSIM index and rate factor associated with each segment of the left channel video stream are transmitted as inputs to the right channel encoder 244. The rate factor may be computed by determining a rate of change of the frames corresponding to a segment. The rate of change may be computed between the last two successive frames of a segment. The frames for a segment may be periodically updated based on the type of segment. For example, movie segment may be updated at a higher rate than that of a slide show. Therefore, the rate factor or rate of change of frames for the movie segment is higher than that of the slide show.

The SSIM index for a segment of the left channel video stream may be compared to a first threshold to determine whether spatial scaling is performed on the corresponding segment of the right channel video stream. The rate factor for the same segment of the left channel video stream may be compared to a second threshold to determine whether spatial scaling is to be performed on the corresponding segment of the right channel video stream. The right channel encoder 244 applies spatial and/or temporal filtering or scaling based on the SSIM index and the rate factor. When spatial scaling is performed, the spatial resolution of the segment may be reduced, for example. When temporal scaling is performed, the frame rate of the segment may be reduced, for example. The type of video scaling or compression performed on the right channel video stream may be categorized into four different types, based on each segment's spatial and temporal activities, as indicated in the following table. The following table comprises a set of scaling rules which may be used to govern whether spatial scaling and/or temporal scaling is performed on a particular segment.

TABLE #1

| Segment Type | Spatial Scaling | Temporal Scaling |
| --- | --- | --- |
| High Spatial Activity/ High Temporal Activity | No | No |
| Low Spatial Activity/ High Temporal Activity | Yes | No |
| High Spatial Activity/ Low Temporal Activity | No | Yes |
| Low Spatial Activity/ Low Temporal Activity | Yes | Yes |

When the SSIM index for a segment is determined to be greater than the first threshold, the right channel encoder 244 may determine that the structural similarity of the segment is high. Since the SSIM index is inversely related to spatial activity, the right channel encoder 244 may determine that the spatial activity is low (when the SSIM index is high) and spatial scaling may be applied to the corresponding segment when processing the right video stream by the right channel encoder 244. When a rate factor for a segment is determined to be less than the second threshold, the right channel encoder 244 may determine that the temporal activity of the segment is low. As a consequence, the right channel encoder 244 may apply temporal scaling to the corresponding segment when processing the right video stream by the right channel encoder 244.

After the right video stream is appropriately scaled and encoded by the right channel encoder 244, the virtual graphics driver 216 facilitates transfer of the right video stream to a transport driver which utilizes the ICA protocol to encapsulate the right channel video data. The transport driver and ICA protocol may also be used to encapsulate the left channel video data. The right and left channel video data are multiplexed and streamed out to one or more client computing devices. The one or more client computing devices receives the multiplexed stereoscopic video stream using the ICA protocol. The stereoscopic 3D video stream is processed by each of the one or more client computing devices and presented as 3D video at a monitor of each of the one or more client computing devices.

In some aspects of the disclosure, network conditions may be monitored and the previously described first threshold and second threshold may be adjusted based on the network conditions observed. For example, any degradation in the transmission link that affects the transmission quality of the outgoing video signal from the host computing device may result in adjustments to the first threshold or (SSIM threshold) and/or adjustments to the second threshold or (rate factor threshold). The degradation may comprise increased latency and increased packet loss, for example. Based on the amount of degradation, the SSIM threshold may be adjusted lower to cause spatial scaling of segments associated with the right channel to occur more readily since the SSIM threshold equals a smaller value. The rate factor threshold may also be adjusted higher such that temporal scaling of segments occurs more readily since the rate factor threshold equals a higher value. The first threshold and the second threshold values may be varied over time based on the available bandwidth.

In some aspects of the disclosure, network conditions may be monitored and the set of scaling rules previously described may be changed or overridden based on transmission line quality and/or conditions. For example, network parameters such as packet loss and latency may be monitored. Furthermore, the available bandwidth of the transmission line may be monitored and measured. For example, if the available bandwidth decreases when the set of scaling rules determines that a segment has high spatial activity and high temporal activity, monoscopic 2D video may be sent instead of stereoscopic 3D video. The host computing device may assess the available bandwidth for transmitting stereoscopic 3D video to a client to determine if that bandwidth allows the transmission of stereoscopic 3D video (comprising both a left 3D channel video stream and a right 3D channel video stream) at the desired temporal scaling and/or spatial scaling (e.g., four types per table #1). If the available bandwidth falls below the required bandwidth necessary for quality transmission of stereoscopic 3D video at the desired temporal and/or spatial scaling, the host computing device may be configured to transmit a single channel monoscopic 2D video stream instead of stereoscopic 3D video.

Figure 3:
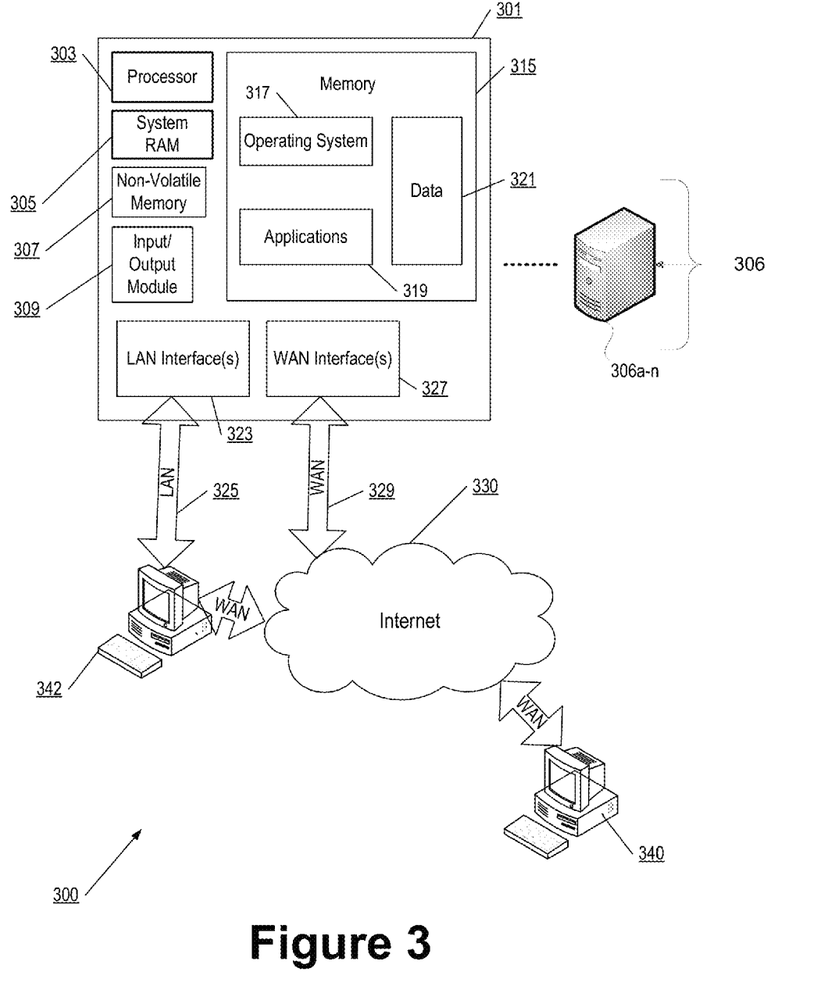
FIG. 3 illustrates a block diagram of a computing environment according to one or more embodiments of the disclosure.

FIG. 3 illustrates a block diagram of a computing environment 300 according to one or more embodiments of the disclosure. The computing environment 300 comprises a generic computing device 301 (e.g., any computing device incorporating the use of at least one processor and at least one memory). The generic computing device 301 may correspond to the host computing device 104 shown in connection with FIG. 1. According to one or more aspects, generic computing device 301 may be a server in a single-server or multi-server desktop virtualization system (e.g., a cloud system) configured to provide virtual machines for client access devices. The generic computing device 301 may have at least one processor 303 for controlling overall operation of the server and its associated components, random access memory (RAM) 305, non-volatile memory 307, input/output (I/O) module 309, and memory 315. The processor 303 may be the same as the processor 204 described in connection with FIG. 2.

I/O module 309 may include a mouse, keypad, touch screen, scanner, optical reader, and/or stylus (or other input device(s)) through which a user of generic computing device 301 may provide input, and may also include one or more of a speaker for providing audio output and a video display device for providing textual, audiovisual, and/or graphical output. Software may be stored within memory 315 and/or other storage devices to provide instructions to processor 303 for enabling generic computing device 301 to perform various functions. For example, memory 315 may store software used by the generic computing device 301, such as an operating system 317, application programs 319, and an associated database 321. Alternatively, some or all of the computer executable instructions for generic computing device 301 may be embodied in firmware stored in the non-volatile memory 307. The non-volatile memory 307 may comprise read only memory (ROM), electrically erasable ROM, or flash memory, for example.

The generic computing device 301, which implements a host for transmitting the stereoscopic 3D video, may be communicatively coupled to one or more computing devices 340, 342, which implement one or more clients. One or more of the computing devices 340 may be accessed via the WAN while the other one or more computing devices 342 may be accessed through a LAN. The computing devices 340, 342, may comprise a desktop computer, a laptop, mobile communication device, or any digital appliance that comprises at least one processor and at least one memory. The one or more computing devices 340, 342 may include many or all of the elements described above with respect to the generic computing device 301. The generic computing device 301 may communicate to the one or more computing devices 340, 342. The network connections depicted in FIG. 3 include a local area network (LAN) 325 and a wide area network (WAN) 329, but may also include other networks (now shown). The generic computing device 301 may be connected to the LAN 325 through a network interface or adapter 323. The generic computing device 301 may include a modem 327 or other WAN network interface for establishing communications over the WAN 329, by way of the Internet 330. It will be appreciated that the network connections shown are illustrative and other means of establishing a communications link between the general computing device 301 and the one or more computing devices 340, 342 may be used. Generic computing device 301 and/or the one or more computing devices 340, 342 may also comprise any type of portable wireless computing devices (e.g., mobile phones, smartphones, PDAs, notebooks, and the like). Each of the one or more computing devices 340, 342 may be the same as the client computing device 108 described in connection with FIG. 1.

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 3, one or more client devices 340, 342 may be in communication with the generic computing device 301, which may act as a server, and one or more other servers 306a-306n. While not shown, in one embodiment, the computing environment 300 may include an appliance installed between the general computing device 301/server(s) 306a-306n and client machine(s) 340, 342. This appliance can manage client/server connections, and in some cases may load balance client connections amongst a plurality of back-end servers 306a-306n (306).

The client devices 340, 342 may in some embodiments be referred to as client machines or a single group of client machines, while server(s) 306 may be referred to as a single server or a single group of servers. In one embodiment, a single client machine (340 or 342) communicates with the generic computing device 301 and one or more servers 306, while in another embodiment a single server (one of 301 and 306a-n) communicates with more than one client machine 340, 342. In yet another embodiment, a single client machine (340 or 342) communicates with a single server (one of 301 and 306a-n).

Each of the one or more client devices 340, 342 may, in some embodiments, be referenced by any one of the following terms: client machine(s); client(s); client computer(s); client device(s); client computing device(s); local machine; remote machine; client node(s); endpoint(s); or endpoint node(s). The servers 301, 306, in some embodiments, may be referenced by any one of the following terms: local machines; remote machines; server farms, or host computing devices.

In one embodiment, each of the one or more client devices 340, 342 may comprise a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in other aspects, the virtual machine may be managed by a hypervisor executing on a server 306a-n or a hypervisor executing on one of the one or more clients 340, 342.

The client machine 340, for example, may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include one or more client devices 340, 342 that display an application output generated by an application remotely executing on a generic computing device 301 and/or servers 306. In these embodiments, the client devices 340, 342 may execute a virtual machine receiver program or application to display the video output using a client monitor in an application window, a browser, or other output window. In one example, the application is executed on a desktop, while in other examples, the application is an application that generates a desktop view. A desktop view may include a graphical shell providing a user interface for an instance of an operating system in which local and/or remote applications can be integrated. Applications, as used herein, are programs that execute after an instance of an operating system (and, optionally, also the desktop) has been loaded.

The generic computing device 301 (e.g., server) and/or other servers 306, in some embodiments, may execute a remote presentation client or other client or program that uses a thin-client or remote-display protocol to capture display output generated by an application executing on the one or more generic computing device 301 and/or servers 306 and transmits the application display output to the one or more remote clients 340, 342. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment may include a plurality of servers 106a-106n such that the servers may be logically grouped together into a server farm, for example, in a cloud computing environment. The server farm can include servers that are geographically dispersed and logically grouped together, or servers that are located proximate to each other and logically grouped together. Geographically dispersed servers 106a-106n within a server farm may, in some embodiments, communicate using a WAN, MAN, or LAN, where different geographic regions may be characterized as: different continents; different regions of a continent; different countries; different states; different cities; different campuses; different rooms; or any combination of the preceding geographical locations. In some embodiments the server farm may be administered as a single entity, while in other embodiments the server farm may include multiple server farms.

In some embodiments, a server farm may include servers 306 that execute a substantially similar type of operating system platform (e.g., WINDOWS NT, manufactured by Microsoft Corp. of Redmond, Wash., UNIX, LINUX, or SNOW LEOPARD.) In other embodiments, the server farm may include a first group of servers that execute a first type of operating system platform, and a second group of servers that execute a second type of operating system platform. The server farm, in other embodiments, can include servers that execute different types of operating system platforms.

The generic computing device 301 and one or more servers 306, in some embodiments, may be any server type. In other embodiments, generic computing device 301 and the one or more servers 306 may be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server executing an active directory; or a server executing an application acceleration program that provides firewall functionality, application functionality, or load balancing functionality. Some embodiments include a first server 306a that receives requests from a client machine 340, 342, forwards the request to a second server 306b-n, and responds to the request generated by the client device 340, 342 with a response from the second server 306b-n. The first server 306a can acquire an enumeration of applications available to one of the client machines 340, 342 and well as address information associated with an application server of the servers 306 hosting an application identified within the enumeration of applications. The first server 306a can then present a response to the client's request using a web interface, for example, and communicate directly with one or more of the clients 340, 342 to provide the one or more clients 340, 342 with access to an identified application. In a representative embodiment, the generic computing device 301 and the one or more servers 306 may comprise one or more servers capable of processing 2D video streams into stereoscopic 3D streams and transmitting the stereoscopic 3D streams to one or more clients 340, 342.

Client devices 340, 342 may, in some embodiments, be a client node that seeks access to resources provided by the generic computing device 301 and the servers 306. In other embodiments, the generic computing device 301 and the servers 306 may provide clients 340, 342 or client nodes with access to hosted resources. The generic computing device 301 and the servers 306, in some embodiments, function as a master node such that the master node communicates with one or more clients 340, 342. In some embodiments, the master node can identify and provide address information associated with a server (of the generic computing device 301 and the one or more servers 306) that hosts a requested application, to one or more clients 340, 342 and/or generic computing device 301 and the servers 306. Yet, in other embodiments, the master node can be a server farm, a client 340, 342, a cluster of client nodes, or an appliance. The resources provided by the generic computing device 301 and the servers 306 may comprise any type of stereoscopic 3D media. For example, the media may comprise an application such as word processing or graphics application, a slide show, a movie, or any other type of multimedia.

The generic computing device 301 may transmit data over the Internet 330 to the clients 340, 342 as shown in FIG. 3. The WAN 329 and/or LAN 325 may comprise one or more sub-networks, and can be implemented using any combination of the clients 340, 342, servers 306, computing device(s) 301, digital appliances, and network devices (not shown) included within the computing environment 300. The Internet 330 may be implemented using any combination of the following network types: ATM (Asynchronous Transfer Mode); SONET (Synchronous Optical Network); SDH (Synchronous Digital Hierarchy). The network topology of the WAN 329 and LAN 325 may differ within different embodiments, and possible network topologies include but are not limited to: a bus network topology; a star network topology; a ring network topology; a repeater-based network topology; or a tiered-star network topology. Additional embodiments may include mobile telephone networks that use a protocol to communicate among mobile devices, where the protocol may include, but is not limited to: AMPS; TDMA; CDMA; GSM; GPRS; UMTS; LTE; WiMAX; EDGE, or any other protocol capable of transmitting data among mobile devices.

Figure 4:
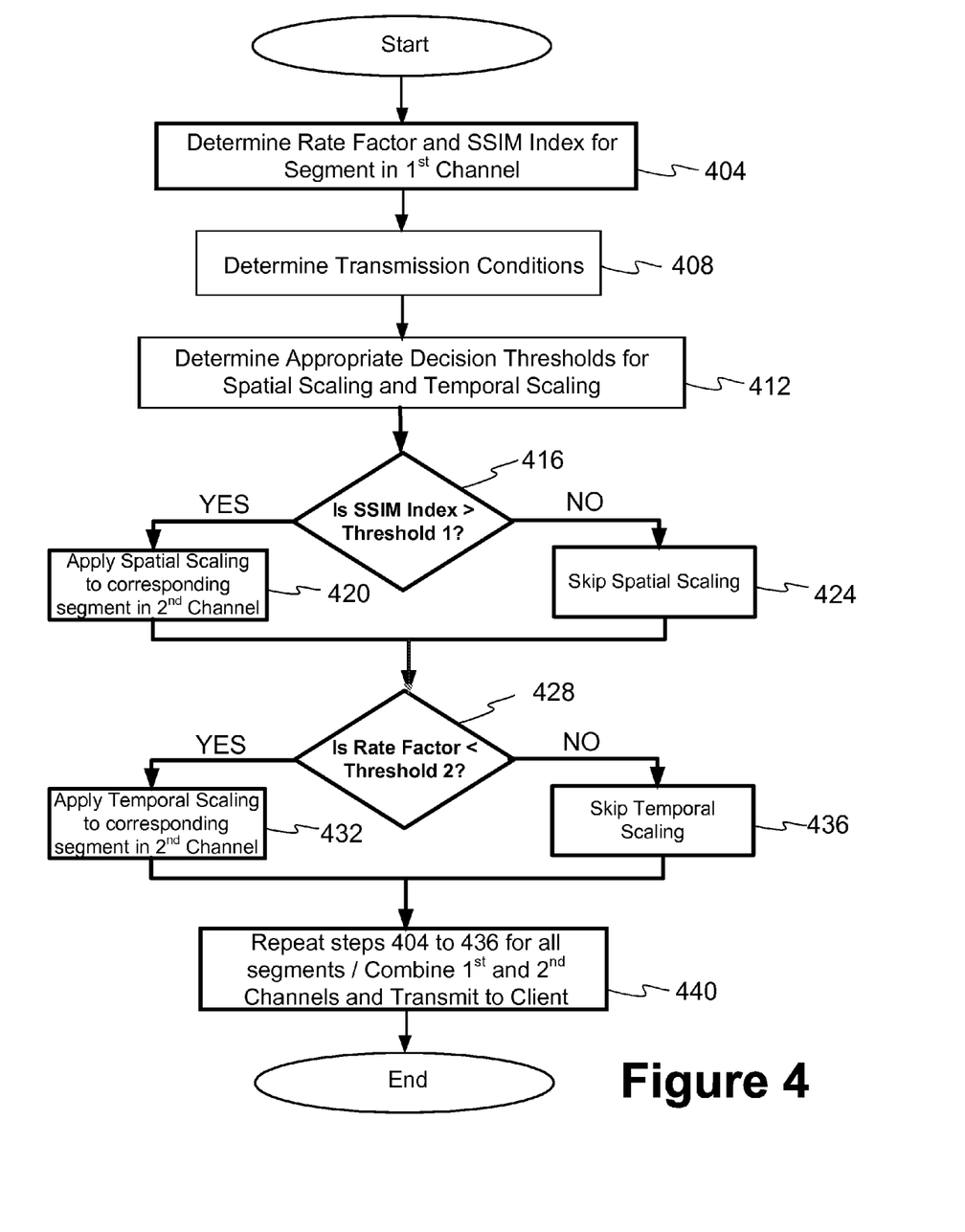
FIG. 4 is an operational flow diagram illustrating how a stereoscopic 3D video stream is prepared at a host and transmitted to a client in accordance with an embodiment of the disclosure.

FIG. 4 is an operational flow diagram illustrating how a stereoscopic 3D video stream is prepared at a host and transmitted to a client in accordance with an embodiment of the disclosure.

At step 404, a rate factor is determined for a segment of a video stream. The video stream may be obtained from a graphics card by way of using a stereoscopic 3D driver. The video stream is used to generate a first channel and a second channel. The first channel may be used to generate a left channel in stereoscopic 3D video while the second channel may be used to generate a right channel in the stereoscopic 3D video. Alternatively, the first channel may be used to generate a right channel in stereoscopic 3D video while the second channel may be used to generate a left channel in the stereoscopic 3D video. Two successive frames of a segment may be compared and the structural similarity (SSIM) between the two successive frames may be determined. An encoder may be used to identify a segment in a first frame period and the same segment in a second frame period. The encoder may compare the SSIM of a particular segment between two successive or consecutive frame periods. The encoder may be part of a codec, for example. The structural similarity between successive frames of a segment may be expressed as a SSIM index. A software or hardware encoder may be used to compute the SSIM index. One or more SSIM indices corresponding to one or more segments of a frame may be stored in system RAM as a look-up table. The SSIM indices may be stored by way of a virtual graphics driver. A rate factor may be determined for each of the one or more segments. The rate factor is based on the frequency in which frames of a segment are refreshed or updated. The rate factors for all segments to be displayed on the screen may be stored in system RAM of the host computing device 104 shown in connection with FIG. 1.

Next, at step 408, the host computing device may assess and determine the transmission conditions for transmitting the stereoscopic 3D video. The transmission condition of the network between the host and the client may be assessed. The condition may be assessed using various network test and measurement tools. For example, the transmission characteristics between various network nodes may be assessed by transmitting test packets from the host to the client. When the host transmits test packets to the client, the client may acknowledge the transmission of the test packets and communicate various network parameters back to the client. Parameters such as latency, packet loss, and bandwidth may be used to determine data transmission conditions.

Next, at step 412, the host computing device may determine the appropriate decision thresholds used for determining whether spatial scaling and/or temporal scaling are/is performed for a segment of a frame provided by the second channel. For example, a first threshold may be used to determine whether spatial scaling is performed on a segment of a frame of the second channel. The first threshold may be compared against an SSIM index corresponding to a segment. Likewise, a second threshold may be compared against the rate factor corresponding to the segment.

At step 416, a decision is made whether the SSIM index of a segment is greater than the first threshold. If it is determined that the SSIM index of the segment is greater than the first threshold, then a decision is made that the structural similarly is high enough (or the spatial activity is low enough) such that the process continues with step 420. Otherwise, if it is determined that the SSIM index is less than or equal to the first threshold, the process continues with step 424, at which spatial scaling is skipped. At step 420, spatial scaling is applied to the corresponding segment in the second channel since the spatial activity is lower than the first threshold. The spatial scaling may comprise a reduction in resolution by any scaling factor in horizontal and/or vertical spatial directions. For example, horizontal subsampling of pixels may be performed.

Next, at step 428, a decision is made whether the rate factor of a segment is less than the second threshold. If the rate factor of the segment is less than the second threshold, then a decision is made that the temporal activity is low enough such that the process proceeds with step 432. Otherwise, if the rate factor is greater than or equal to the second threshold, the process continues with step 436, at which the temporal scaling is skipped. At step 432, temporal scaling is applied to the corresponding segment in the second channel since the rate factor is lower than the second threshold. The temporal scaling may comprise a decrease in the frame rate of the corresponding segment by any scaling factor. For example, the rate in which frames are refreshed for the segment may be halved.

Next, the process proceeds with step 440, at which steps 404 to 436 are repeated for all other segments (each of one or more segments for the second channel to be displayed on the screen at the client computing device). After all segments have been assessed and temporally and/or spatially scaled based on their SSIM indices and rate factors, the segments of the second channel are combined with the segments of the first channel. The resulting stereoscopic 3D video is transmitted to the client. The 3D video is transmitted from the host to the client by way of using the ICA protocol.

The foregoing presents a simplified summary of the disclosure in order to provide a basic understanding of some aspects. It is not intended to identify key or critical elements of the invention or to delineate the scope of the invention. Although not required, the various aspects described herein may be embodied as a method, a data processing system, or as a computer-readable medium for storing computer-executable instructions that are capable of being executed by a processor of a computer system. Aspects of the invention have been described in terms of illustrative embodiments thereof.

Numerous other embodiments, modifications, and variations within the scope and spirit of the disclosed invention are possible from a review of this entire disclosure. For example, the steps illustrated in the illustrative figures may be performed in other than the recited order, and that one or more steps illustrated may be optional in accordance with aspects of the disclosure. Furthermore, for example, while the left channel video stream may be to obtain rate factors and SSIM indices for use on the right channel, it is contemplated that in other embodiments, the right channel video stream may be used to obtain rate factors and SSIM indices for use on the left channel. While some embodiments have been described with respect to specific examples, other embodiments include numerous variations and permutations of the above described systems and techniques.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A computing device comprising:
   at least one processor; and
   at least one memory for storing computer executable instructions, wherein execution of said computer executable instructions by said at least one processor causes said computing device to perform a method comprising:
   first identifying a first frame of a segment of video in a first channel at a first time;
   second identifying a second frame of said segment of said video in said first channel at a second time, said first time occurring one frame period before said second time;
   spatially scaling said segment when a structural similarity (SSIM) index is greater than a first threshold value, said spatial scaling reducing the spatial resolution of said segment to generate a spatially scaled segment, said structural similarity (SSIM) index providing a value that indicates a spatial similarity between said first frame and said second frame;
   temporally scaling one of: a) said segment and b) said spatially scaled segment, when a rate of change between said first frame and said second frame of said segment falls below a second threshold value, said temporal scaling generating one of: a) a temporally scaled segment and b) a temporally and spatially scaled segment;
   multiplexing one of: a) said segment, b) said spatially scaled segment, c) said temporally scaled segment, and d) said temporally and spatially scaled segment in a second channel with said segment of said video in said first channel, wherein said first channel and said second channel are used for providing streaming stereoscopic three-dimensional video;
   monitoring one or more network parameters on a transmission line used to transmit said streaming stereoscopic three-dimensional video while transmitting said streaming stereoscopic three-dimensional video; and
   varying each of said first threshold value and said second threshold value over time during transmission of said streaming stereoscopic three-dimensional video, based on said monitored network parameters.

2. The computing device of claim 1, wherein said segment comprises one of: a movie, a slide show, and an application providing a graphical user interface.

3. The computing device of claim 1 wherein said segment is transmitted as two-dimensional video when said monitored network parameters associated with transmission of said stereoscopic three-dimensional video fall below a predetermined threshold necessary for quality transmission of said streaming stereoscopic three-dimensional video.

4. The computing device of claim 1 wherein said first channel provides video for viewing by a left eye and said second channel provides video for viewing by a right eye.

5. The computing device of claim 1 wherein computing device transmits said multiplexed segments to a client by way of using an independent computing architecture (ICA) protocol.

6. The computing device of claim 1 wherein an encoder of said computing device performs said spatial and said temporal scaling by way of receiving said rate of change from a rate factor generator and said structural similarity (SSIM) index from a structural similarity index generator.

7. The computing device of claim 1, wherein said network parameters comprise network latency, packet loss, and available bandwidth.

8. A method comprising:
   first identifying a first frame of a segment of video in a first channel at a first time;
   second identifying a second frame of said segment of said video in said first channel at a second time, said first time occurring one frame period before said second time;
   spatially scaling said segment when a structural similarity (SSIM) index is greater than a first threshold value, said spatial scaling reducing the spatial resolution of said segment to generate a spatially scaled segment, said structural similarity (SSIM) index providing a value that indicates a spatial similarity between said first frame and said second frame;
   temporally scaling one of: a) said segment and b) said spatially scaled segment, when a rate of change between said first frame and said second frame of said segment falls below a second threshold value, said temporal scaling generating one of: a) a temporally scaled segment and b) a temporally and spatially scaled segment;
   multiplexing one of: a) said segment, b) said spatially scaled segment, c) said temporally scaled segment, and d) said temporally and spatially scaled segment in a second channel with said segment of said video in said first channel, wherein said first channel and said second channel are used for providing streaming stereoscopic three-dimensional video, wherein said first identifying, second identifying, spatial scaling, temporally scaling, and multiplexing is performed by executing instructions by at least one processor of a computing device, said instructions stored in a memory of said computing device;
   monitoring one or more network parameters on a transmission line used to transmit said streaming stereoscopic three-dimensional video while transmitting said streaming stereoscopic three-dimensional video; and
   varying each of said first threshold value and said second threshold value over time during transmission of said streaming stereoscopic three-dimensional video, based on said monitored network parameters.

9. The method of claim 8, wherein said segment comprises one of: a movie, a slide show, and an application providing a graphical user interface.

10. The method of claim 8 wherein said segment is transmitted as two-dimensional video when said monitored network parameters associated with transmission of said stereoscopic three-dimensional video fall below a predetermined threshold necessary for quality transmission of said streaming stereoscopic three-dimensional video.

11. The method of claim 8 wherein said first channel provides video for viewing by a left eye and said second channel provides video for viewing by a right eye.

12. The method of claim 8 wherein said computing device transmits said multiplexed segments to a client by way of using an independent computing architecture (ICA) protocol.

13. The method of claim 8 wherein an encoder of said computing device performs said spatial and said temporal scaling by way of receiving said rate of change from a rate factor generator and said structural similarity (SSIM) index from a structural similarity index generator.

14. The method of claim 8, wherein said network parameters comprise network latency, packet loss, and available bandwidth.

15. A non-transitory computer-readable storage media having stored thereon, a computer program having at least one code section for processing data, said at least one code section being executable by at least one processor of said computer for causing the computer to perform a method comprising:
- first identifying a first frame of a segment of video in a first channel at a first time;
- second identifying a second frame of said segment of said video in said first channel at a second time, said first time occurring one frame period before said second time;
- spatially scaling said segment when a structural similarity (SSIM) index is greater than a first threshold value, said spatial scaling reducing the spatial resolution of said segment to generate a spatially scaled segment, said structural similarity (SSIM) index providing a value that indicates a spatial similarity between said first frame and said second frame;
- temporally scaling one of: a) said segment and b) said spatially scaled segment, when a rate of change between said first frame and said second frame of said segment falls below a second threshold value, said temporal scaling generating one of: a) a temporally scaled segment and b) a temporally and spatially scaled segment;
- multiplexing one of: a) said segment, b) said spatially scaled segment, c) said temporally scaled segment, and d) said temporally and spatially scaled segment in a second channel with said segment of said video in said first channel, wherein said first channel and said second channel are used for providing streaming stereoscopic three-dimensional video;
- monitoring one or more network parameters on a transmission line used to transmit said streaming stereoscopic three-dimensional video while transmitting said streaming stereoscopic three-dimensional video; and
- varying each of said first threshold value and said second threshold value over time during transmission of said streaming stereoscopic three-dimensional video, based on said monitored network parameters.

16. The non-transitory computer-readable storage media of claim 15, wherein said segment comprises one of: a movie, a slide show, and an application providing a graphical user interface.

17. The non-transitory computer-readable storage media of claim 15, wherein said segment is transmitted as two-dimensional video when said monitored network parameters associated with transmission of said stereoscopic three-dimensional video fall below a predetermined threshold necessary for quality transmission of said streaming stereoscopic three-dimensional video.

18. The non-transitory computer-readable storage media of claim 15, wherein said first channel provides video for viewing by a left eye and said second channel provides video for viewing by a right eye.

19. The non-transitory computer-readable storage media of claim 15, wherein said computer transmits said multiplexed segments to a client by way of using an independent computing architecture (ICA) protocol.

20. The non-transitory computer-readable storage media of claim 15, wherein said network parameters comprise network latency, packet loss, and available bandwidth.

\* \* \* \* \*